United States Patent [19]
Lengyel et al.

[11] Patent Number: 5,907,222
[45] Date of Patent: May 25, 1999

[54] HIGH EFFICIENCY BACKLIGHTING SYSTEM FOR REAR ILLUMINATION OF ELECTRONIC DISPLAY DEVICES

[75] Inventors: J. Michael Lengyel, Ramona; Loy L. Spears, Placentia, both of Calif.

[73] Assignee: Litton Systems, Inc., Woodland Hills

[21] Appl. No.: 08/967,442

[22] Filed: Nov. 11, 1997

Related U.S. Application Data

[63] Continuation of application No. 08/632,752, Apr. 16, 1996, abandoned, which is a continuation of application No. 08/150,355, Nov. 3, 1993, abandoned.

[51] Int. Cl.$^6$ .................................................. H05B 41/16
[52] U.S. Cl. ............................ 315/158; 315/309; 315/97; 345/102; 313/493; 313/573; 313/576
[58] Field of Search ................................ 315/105, 309, 315/158, 49, 57, 94, 97, 115, 151; 362/84; 313/493, 549, 573, 576; 345/102

[56] References Cited

U.S. PATENT DOCUMENTS

| | | | |
|---|---|---|---|
| 2,213,868 | 9/1940 | Lucian | 40/134 |
| 2,259,416 | 10/1941 | Gardner | 240/2.25 |
| 2,687,486 | 8/1954 | Heine et al. | 313/109 |
| 2,702,862 | 2/1955 | Finney | 250/43 |
| 3,012,165 | 12/1961 | Schmidt | 313/185 |
| 3,531,687 | 9/1970 | Greber | 315/309 |
| 3,546,521 | 12/1970 | Gelder | 313/192 |
| 3,912,967 | 10/1975 | Longnecker | 315/309 |
| 4,374,340 | 2/1983 | Bouwknegt et al. | 313/220 |

(List continued on next page.)

FOREIGN PATENT DOCUMENTS

| | | |
|---|---|---|
| 0 422 594 A1 | 4/1991 | European Pat. Off. . |
| 0477922 | 4/1992 | European Pat. Off. . |
| 0489477 | 6/1992 | European Pat. Off. . |
| 0 650 313 A2 | 4/1995 | European Pat. Off. . |
| 43 13 195 A1 | 4/1992 | Germany . |
| 3285296 | 12/1991 | Japan . |

OTHER PUBLICATIONS

Akio, et al., "Discharge Lamp Lightup Device", Matsushita Electric Works, Ltd., Apr. 6, 1990, pp. 1–9.
Imamura, Hiroshi, "Rapid Start Type Flourescent Lamp", Matsushita Electric Works, Ltd., Jul. 16, 1980, pp. 1–4.
Hiroyasu, Eriguchi, "Luminous Radiation Electron Tube Lighting Device", Matsushita Electric Works, Ltd., Dec. 8, 1992, pp. 1–7.
Osamu, Miyata, et al., "Heater Control Devise", Stanley Electric Co., Ltd., Feb. 17, 1989, pp. 1–6.
Satohiko, Kitahara, "Power Unit", Canon, Inc., Jan. 14, 1994, pp. 1–9.
"Simple Dimming Circuit for Fluorescent Lamp", IBM Technical Disclosure Bulletin, Sep., 1991, p. 2.
J. Michael Lengyel, "Woe is the Backlight", presented at Aerospace Lighting Institute, Feb. 1992.

*Primary Examiner*—Robert Pascal
*Assistant Examiner*—Justin P. Bettendorf
*Attorney, Agent, or Firm*—Price Gess & Ubell

[57] ABSTRACT

A fluorescent cavity backlight system that provides a high efficiency light source suitable for rear illumination of transmissive electronic display devices. The inventive fluorescent cavity backlight system can be adapted to a wide variety of flat panel display applications. The invention takes a complete system approach towards designing a high efficiency backlight source. The backlight system comprises three major subassemblies: a phosphor illuminator, a fluorescent cavity, and improved control/driver electronics. Each of the subassemblies has been optimized internally, and with respect to each of the other subassemblies.

17 Claims, 5 Drawing Sheets

U.S. PATENT DOCUMENTS

| | | | |
|---|---|---|---|
| 4,492,899 | 1/1985 | Martin | 315/309 |
| 4,583,026 | 4/1986 | Kajiwara et al. | 315/226 |
| 4,744,012 | 5/1988 | Bergkvist | 362/84 |
| 4,881,007 | 11/1989 | Egelstam | 313/493 |
| 4,974,122 | 11/1990 | Shaw | 362/31 |
| 4,978,890 | 12/1990 | Sekiguchi et al. | 315/117 |
| 5,019,749 | 5/1991 | Ito | 315/309 |
| 5,021,931 | 6/1991 | Matsui et al. | 362/84 |
| 5,043,634 | 8/1991 | Rothwell, Jr. et al. | 315/246 |
| 5,072,155 | 12/1991 | Sakurai | 315/219 |
| 5,101,142 | 3/1992 | Chatfield | 315/309 |
| 5,161,041 | 11/1992 | Abileah et al. | 359/40 |
| 5,193,899 | 3/1993 | Oe et al. | 362/224 |
| 5,207,504 | 5/1993 | Swift et al. | 362/260 |
| 5,211,467 | 5/1993 | Seder | 362/84 |
| 5,229,842 | 7/1993 | Dolan et al. . | |
| 5,404,277 | 4/1995 | Lindblad | 362/31 |
| 5,406,172 | 4/1995 | Benett | 315/49 |
| 5,489,819 | 2/1996 | Sakai et al. | 315/49 |
| 5,523,655 | 6/1996 | Jennato et al. | 315/246 |

HIGH EFFICIENCY BACKLIGHTING SYSTEM FOR REAR ILLUMINATION OF ELECTRONIC DISPLAY DEVICES

This is a continuation of application Ser. No. 08/632,752, now abandoned filed on Apr. 16, 1996, which application is a continuation of U.S. application Ser. No. 08/150,355, filed on Nov. 3, 1993, and now abandoned.

BACKGROUND OF THE INVENTION

1. Field of the Invention

This invention relates to a method and apparatus for illumination of electronic display devices, and more particularly to a high efficiency backlighting system suitable for back-illuminating transmissive electronic display devices.

2. Description of Related Art

Transmissive electronic display devices, such as active matrix liquid crystal displays (AMLCDs) or passive matrix liquid crystal displays (PMLCDs), are not emissive displays. That is, such transmissive displays are not themselves a source of light, as is, for example, a cathode ray tube (CRT). Accordingly, transmissive displays require a source of rear or back illumination to be usable in most applications and under widely varying ambient lighting conditions.

FIG. 1 shows a typical use of a flat panel transmissive display 1 as an output device (i.e., a visual display). (In the example shown, a graphical map 2 of a street intersection is displayed.) Typical uses of transmissive displays include sensor indicators and information outputs for automobiles, aircraft, scientific instruments, computers, airport information terminals, etc.

In the prior art, transmissive displays of the type shown in FIG. 1 have typically been backlit by bent or serpentine-shaped fluorescent lamp mounted behind the rear surface of the transmissive display. FIG. 2 diagrammatically shows a typical shape for such a fluorescent lamp 3. An essentially conventional straight fluorescent tube is heated and bent to the shape shown. Such a lamp 3 may be used in a reflective cavity and with a diffuser to provide a rudimentary backlight "system" behind a transmissive display. A fluorescent lamp backlight system is proven technology with moderately low development risk for most applications. Because of the low risk factor, moderate cost, efficiency, and limited alternative approaches, serpentine fluorescent backlighting systems are the primary backlighting approach for many military and commercial flat panel transmissive displays.

However, performance parameters and operating conditions of transmissive displays can vary greatly. For example, commercial transmissive displays do not require the same level of performance and operational ruggedness as military or automotive display devices. Consequently, backlight systems can vary in complexity, effectiveness, efficiency, and reliability, depending on the performance and operational requirements of their associated transmissive display. In general, prior art backlight systems do not have the characteristics necessary to be used in a wide range of applications. In particular, it has been found that conventional prior art fluorescent backlight systems have a number of problems, most notably:

Poor luminous efficiency
Poor uniformity of lighting
Short useful life
Narrow dimming range
High heat generation
High ignition voltages
External heating required for cold starts Accordingly, there is a need to provide a high efficiency backlighting system that is suitable for back-illuminating transmissive electronic display devices and which overcomes these problems. The present invention provides such a system.

SUMMARY OF THE INVENTION

This invention comprises a fluorescent cavity backlight system that provides a high efficiency light source suitable for rear illumination of transmissive electronic display devices. The inventive fluorescent cavity backlight system can be adapted to a wide variety of flat panel display applications. The preferred embodiment of the present invention has more than 5 times the efficiency of conventional prior art backlight systems.

The invention takes a complete system approach towards designing a high efficiency backlight source. The inventive system comprises three major subassemblies: a phosphor illuminator, a fluorescent cavity, and improved control/driver electronics. Each of the subassemblies has been optimized internally, and with respect to each of the other subassemblies. More particularly, the preferred embodiment of the invention includes the following characteristics:

(1) Phosphor illuminator—this comprises an ultraviolet (UV) gas discharge light tube having no coating phosphor, internally or externally, in or on the tube. The light tube is fabricated to provide the highest UV flux density per unit volume of the phosphor illuminator. The tube is preferably miter-cut and joined together to provide better illumination at the corners of the joints and to provide a better fit to the shape of the fluorescent cavity. The typical fabrication process with this configuration allows spacing between the legs of the lamp down to about 2 mm. However, several alternative fabrication processes may be used.

The preferred fill gas for the phosphor illuminator lamp is a mixture of about 95% argon and 5% neon, with typical gas pressure in the range of about 0.5 to about 3.0 torr. This mixture and pressure range provides for significantly lower ignition voltage than the prior art, particularly at low temperature (about −55° C.) operation. The fill gas and pressure range permits use of variable duty cycle driving currents to provide a dimming function for the lamp. The lower ignition voltage provided by the inventive lamp reduces the complexity of the drive circuitry.

(2) Fluorescent cavity—The phosphor illuminator lamp is placed in a box-like fluorescent cavity. The rear and side surfaces of the cavity are coated with a photoluminescent phosphor, which converts UV from the phosphor illuminator lamp into visible light. A diffusing cover is provided for the cavity which is phosphor coated on the side facing the inside of the cavity. The external side of the cover may be ground or textured in order to provide better light diffusion. A typical fluorescent cavity would be approximately 6×8 inches by 1 inch deep using a 12 mm diameter phosphor illuminator lamp. A focusing element (a directional intensifier) can be overlaid onto the face of the cover to redirect scattered or diffused light, resulting in an increase of luminescence on the face of the display from selected viewing angles. One way to do this is by using microreplicated optics. In practice, this could be an array of achromatic refracting prisms or similar structures.

(3) Control/driver—The control/driver of the present invention provides for dimming ratios in excess of the 2,000:1, a requirement typically found in military and commercial applications. This expanded dimming ratio is achieved through the use of a unique digitally controlled circuit to control the phosphor illuminator lamp excitation voltage. The control/driver provides excitation to heat the cathodes of, and supply a controlled arc current to, a hot-cathode phosphor illuminator lamp. Energy is delivered to the lamp in the form of voltage and current in time. Voltage or current are highly controlled under all operating states of the lamp through a variable duty cycle regulated by the control/driver. The control/driver are designed to provide this excitation at a very high efficiency.

Advantages of the present invention in comparison to the prior art include:

Improved luminous efficiency

Improved uniformity of lighting

Longer useful life

A large dimming range (bright to dim ratio)

Reduced heat generation

Low ignition voltages

No required external heating for cold starts

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Figure 1:
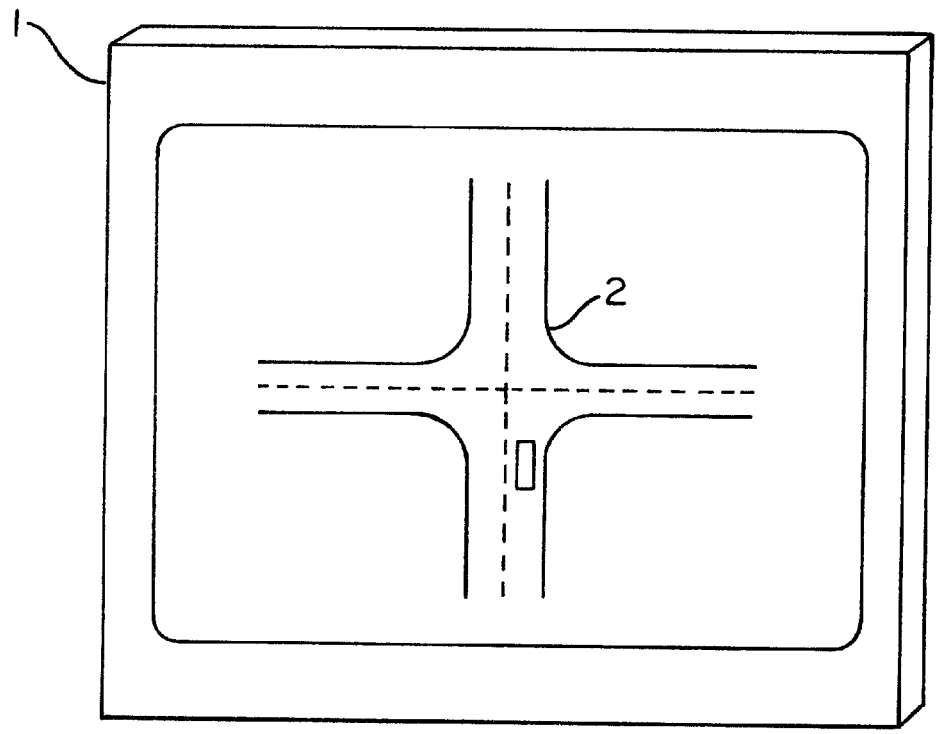
FIG. 1 is a front view of a typical prior art transmissive display used as an output device.

Throughout this description, the preferred embodiment and examples shown should be considered as exemplars, rather than as limitations on the present invention.

The invention takes a complete system approach towards designing a high efficiency backlight source. The invention provides a high intensity, very uniform, controllable light source for the back illumination of liquid crystal and other types of transmissive displays. The invention uses ultraviolet (UV) photon bombardment of photoluminescent phosphors to make visible light. Key differences over prior art lie in the construction of the system and its high degree of optimization for specific performance parameters.

OVERVIEW

The inventive system comprises three major subassemblies: a phosphor illuminator, a fluorescent cavity, and improved control/driver electronics. Each of the subassemblies has been optimized internally, and with respect to each of the other subassemblies. Each of these elements and details of their manufacture are described below in separate sections. General factors taken into account in the design of the preferred embodiment of the invention include performance requirements, efficiency, heat, and dimming.

Performance Requirements

Mention of display performance requirements is made only to emphasize the importance of an integrated design and to show the dependency of a transmissive display on the backlight. The overall complexity of the integrated display assembly and the backlight are very strongly influenced by performance requirements. Typical performance requirements for such displays are listed below:

Daylight readable

High luminance

High contrast

Broad viewing angles

Large color palette

High luminance uniformity

High bright to dim ratios

Night Vision Imaging System (NVIS) Compatible

Display performance is influenced heavily by the quality and efficiency of the components (such as polarizers, color filters, and liquid crystal materials) that comprise a liquid crystal display (LCD) assembly. For example, color active matrix liquid crystal display (AMLCD) assemblies pass only about 2 to 4% of the available backlight luminance. A flat panel display does not enjoy the benefit of generating localized luminance at the face of the display, as does a CRT. Accordingly, the entire display area is backlit at a constant (but selectable) intensity at all times. The illumination characteristics of the backlight are modified by each and every component in the optical stack. Thus, the burden of providing adequate performance of the flat panel display is in large part borne by the backlight. A design criteria of the present invention was to provide a high performance backlight system with high luminance, low power, and a wide dimming ratio.

Efficiency

The invention employs fluorescence as the lighting agent of choice for the generation of visible light for two reasons. First, high quantum efficiency fluorescent phosphors offer the highest lumen-per-watt conversion efficiency of any lighting technology presently in common use. Published data suggests efficiencies of 40 lumens per watt are achieved with conventional fluorescent lamp technology. (This data presumes the power dissipated by the lamp is delivered to the positive column, or mercury arc stream, and does not account for losses attributed to lamp drivers, heater circuits, or filaments.) Second, the narrow band emissions of the selected phosphors are well suited to flat panel display applications where high purity primary colors are desired.

Heat

In general, all but a very small amount of the power consumed by any lighting technology is converted to heat. High heat often establishes the limit of visual performance in flat panel transmissive display technology, where prolonged exposure to high heat would cause catastrophic failure of the liquid crystal display assembly. For this reason, it is necessary to keep the heat generated in the backlight assembly to a minimum. For example, backlight systems that provide 5,000 to 6,000 foot-Lamberts (fL) of uniform diffuse luminance are considered exceptional by today's standards. Using a serpentine fluorescent lamp with a heavy diffuser to achieve this level of performance requires significant power, and hence heat. A design criteria of the present invention was to reduce heat while providing high levels of luminance by providing high luminous efficiency.

Dimming

The luminous intensity of a display is adjusted for viewability above the surrounding ambient light. Viewability will vary for different types of displays and for the environment in which it is used. Where large dimming ratios are required (2,000:1 or greater, as might be found in a military aircraft or automotive applications), it is necessary to dim the illuminator in the inventive backlight system to a very low level. This invention accomplishes flicker free dimming at a low light level operating mode via digital control/driver. The ability of the present invention to operate the ultraviolet phosphor illuminator in an unstable but highly controlled manner is important for this high range of dimming.

(1) PHOSPHOR ILLUMINATOR

Conventional Fluorescent Lamps

The body of a conventional fluorescent lamp is a tubular (usually round) glass or quartz envelope which is transparent to visible light but not to UV. The envelope houses (1) a blend of photoluminescent phosphors (that is, phosphors that release visible light when exposed to UV photons; these phosphors differ from CRT phosphors that require electron stimulation to release visible light), (2) inert fill gases such as argon or krypton, (3) a small amount of mercury to provide ultraviolet (UV) emission lines at 186 nm and 254 nm when ionized, (4) a cathode to provide a source of electrons for ionizing the mercury and sustaining the resulting plasma (arc stream), and (5) an anode to provide a return path for current flow out of the lamp. The electrical energy for the lamp is provided by an ordinary electrical ballast, which is generally inefficient and not dimmable over wide ranges of visual light output.

Light manufactured in a fluorescent lamp is the result of a fairly complex energy conversion process (electron energy to UV light energy to visible light energy) that is influenced by many factors. These factors include: lamp length, lamp diameter, fill gas type, fill gas pressure, amount of mercury present in the lamp (mercury pressure), filament type, filament materials, filament temperature, and filament location.

The power-to-light conversion process that occurs in a conventional fluorescent lamp is a result of current flow propagated by the motion of electrons and ions inside the lamp. Electron mobility is much greater than ion mobility, and thus electrons carry essentially all the current and receive essentially all of the electrical power input. Lamp behavior is determined to a large degree by how the electrons dissipate that power. Electrons can collide with each other, sharing energy with each other. This establishes an electron energy distribution inside the lamp envelope. Electrons also can collide "elastically" with inert gas atoms, transferring a very small amount of kinetic energy to the gas atoms per collision. However, there are many such collisions, and this is an energy conversion loss.

Electrons also can collide "inelastically" with mercury atoms, converting the bulk of electron kinetic energy into excitation energy of the mercury atoms. Such excitation causes loosely bound electrons in the mercury atoms to be elevated to a higher energy level. The excited mercury atoms then relax to the previous unexcited state and the result of this relaxation is energy released through radiation. Most of this radiation is ultraviolet (mercury 186 nm and 254 nm emission lines) that is used at almost 100% efficiency by the internal phosphor to make visible light. In general, the efficiency of the lamp is determined by the fraction of electrical power consumption that is dissipated through this channel.

The burden of establishing a balance among all of the physical, electrical, and mechanical factors that influence fluorescent lamp efficiency and performance is usually shouldered by the lamp manufacturer. Thus, prior art fluorescent lamps as used in backlights are typically not designed from a system viewpoint. Accordingly, seldom are the performance requirements for backlit transmissive displays as a system fully met with a serpentine fluorescent backlight.

A principal problem of prior art fluorescent lamps is the use of internal phosphors. Because of the ease with which ultraviolet photons are absorbed by most materials, the phosphor material is usually in intimate contact with the gaseous or vapor mixture. Several deficiencies of previous designs arise from the fact that the phosphors, gaseous mixture, and cathodes are all exposed to each other. Mercury vapor from the gaseous mixture and metal ions which boil off the cathodes interact with the phosphors, reducing their life.

Further, all known materials that are available for use as a binder for the phosphor slurry that is applied to the inside of a conventional fluorescent lamp absorb UV. In conventional fluorescent lamps, an organic material is used for adhesion to the glass envelope and is "baked out" of the phosphor in an attempt to eliminate UV absorption. This is not a 100% effective solution to the problem. Manufacturing processes may not eliminate all the residual binder materials, and the arc stream can become contaminated. Contamination can result in degraded lamp performance and shortened lamp life.

Phosphor Illuminator Lamp

Rather than using a conventional fluorescent lamp, the present invention uses a phosphor illuminator lamp 14 (see FIG. 3A) in conjunction with a fluorescent cavity (described below). The phosphor illuminator lamp 14 comprises a UV gas discharge lamp, the envelope or tube of which is made of quartz, glass, or other material that has high UV transmittance. (In contrast, prior art fluorescent lamps have an envelope made of soda lime or borosilicate glass, which absorb the ultraviolet energy necessary for photoluminescence of the phosphors within the tube.) Avoiding phosphor and residual binder contaminants inside of the lamp envelope contributes to a projected longer lamp life.

The envelope of the phosphor illuminator lamp 14 preferably has a generally tubular configuration. The lamp tube generally has a round cross-section, and has about a 1–2 mm wall thickness and an inside diameter of about 7 mm to about 13 mm in the preferred embodiment. If desired, the envelope may be formed with indentations to provide greater surface area and/or effective tube length.

While the tubing of the phosphor illuminator lamp 14 preferably has a round cross-section, the tubing may also be elliptical, oval, square, hexagonal, or any other desired shape. Further, other diameters and wall-thicknesses may be used.

Two types of quartz can be used for envelope material, "ozone producing" and "ozone free". Ozone is the byproduct of short wave UV (e.g., the mercury 186 nm line) coming into contact with oxygen. The difference in the two materials is that a dopant (typically titanium) that absorbs the 186 nm mercury emission line is added to ozone producing quartz to make ozone free quartz. The 186 nm line accounts for approximately 15% of the total amount of UV that has the potential to make light. For this reason, it is desirable to use ozone producing quartz in the backlight assembly if the ozone can be controlled or contained through other means, such as a sealed backlight cavity.

Lamp Design & Manufacture

Figure 2:
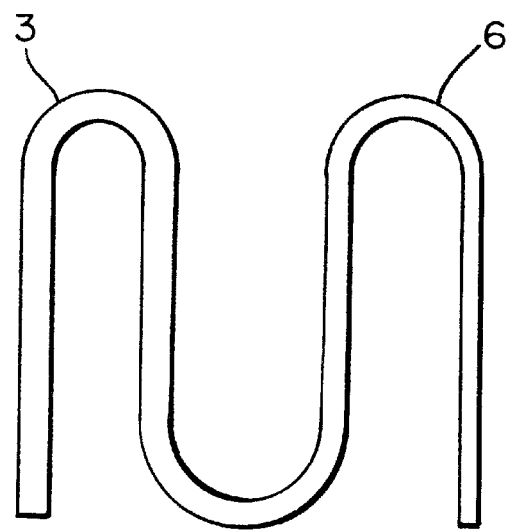
FIG. 2 is a diagram of a typical prior art fluorescent lamp shape used to backlight transmissive displays.

The manufacturing process for the phosphor illuminator lamp 14 also differs from the prior art. Phosphor deposition and curing processes used when manufacturing conventional fluorescent lamps will not accommodate coating a pre-bent envelope. Consequently, the glass envelope of a straight fluorescent lamp must be heated and bent to acquire a serpentine configuration. Using this process, it is difficult to maintain uniform bends. Further, bending a straight lamp into a serpentine configuration compromises the integrity of the phosphor coating on the inside of the lamp for two reasons. First, localized high temperature heating of the glass envelope required to bend the lamp can damage the phosphor in that immediate area. Second, bending the lamp literally increases the envelope length over the outside bend radius, resulting in a less dense phosphor coating over the bend area and weakening of the lamp tube. Accordingly, the extreme corners 6 (see FIG. 2) of the serpentine backlight assembly are difficult to light. This results in notable light loss at such corners.

For a prior art serpentine configuration, the manufacturing limit that determines the number of lamp legs that can be placed inside the reflecting cavity is the spacing between each leg of the lamp. This spacing is generally limited to the diameter of the lamp. For example, for 12 mm diameter tubing, adjacent legs are spaced no closer than about 12 mm. If the bend radius is smaller than the diameter of the lamp, the distorted envelope can restrict the arc stream used to produce fluorescence of the phosphors, resulting in significant light loss in the region of the bend. Likewise, a large bend radius will result in fewer legs, reducing the potential to make light.

The surface luminance of a fluorescent lamp is often used to rate the potential light output of the backlight. In an ideal situation, the relationship of surface luminance for a fluorescent lamp to delivered luminance at the back side of an LCD is a direct ratio of the respective areas. For this reason it is desirable to have as much active area (lamp surface) inside the backlight cavity as possible.

For example, a flat panel display surface of 6×8 inches has 48 square inches that must be uniformly illuminated. The backlight cavity is generally limited to a 1 inch depth (or less). This size cavity could accommodate a 15 mm diameter lamp. With this volume, it is feasible to use a lamp with five 8-inch lateral legs and maintain acceptable bend radii. This results in an overall lamp length of about 40 inches. (Lamps of this diameter and length are not generally used in display applications because they are extremely difficult to bend. However, in this example, a 40-inch lamp length is used for simplicity of illustration.)

The total surface area of the lamp is calculated to be;

Equation 1: surface area of cylinder=$2\pi rL$ or, approximately 94 square inches of illuminated surface area in this example.

The total potential back-illumination intensity of this configuration would be:

Equation 2: total fL=(94/48)*surface luminance of lamp, or approximately 2 times the surface luminance of the lamp in this example.

Figure 3A:
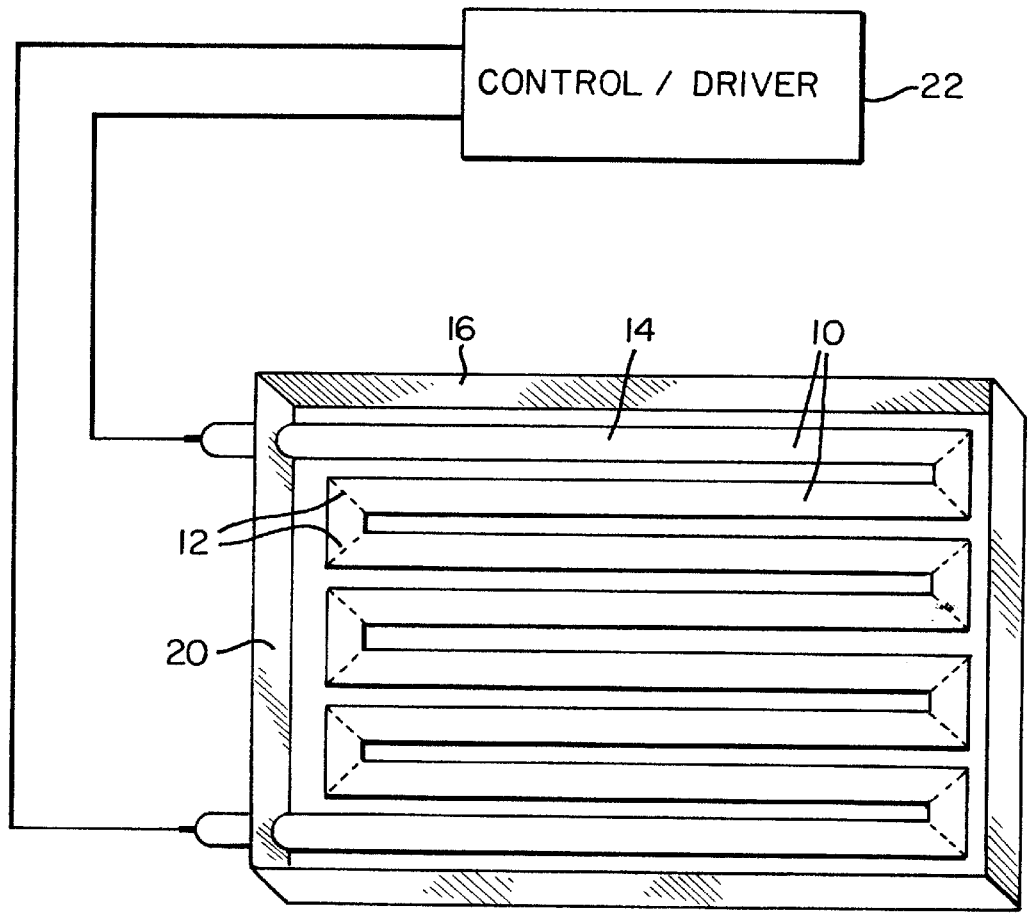
FIG. 3A is a front perspective view of the fluorescent cavity and phosphor illuminator of the preferred embodiment of the present invention, showing a single "high fill factor" lamp.

Surface luminance of fluorescent lamps is dependent on many factors, but luminance values of 6,000 to 10,000 fL (measured on the lamp envelope) are common for tri-band fluorescent lamps that use high-efficiency rare earth phosphors. From Equation 2, the unrestricted light output of the example integrated backlight assembly could theoretically approach 20,000 fL with moderate power. However, in practice, the actual luminance is drastically reduced from this potential value because significant losses occur. Conventional reflective cavities alone account for a loss of approximately 30% to 40% of the light, mostly due to absorption. In the preferred embodiment of the present invention, the prior problems attendant to bending fluorescent lamps is completely avoided. Referring to FIG. 3A, UV transmissive tubes are cut into segments 10 with mitered corners 12 to form a phosphor illuminator lamp 14. The segments are then heat welded together in known fashion to form a "square corned" serpentine shape that is sized to fit within the fluorescent cavity, as shown in FIG. 3A. This approach does not require bending the lamp, and yields far superior dimensional tolerances. In addition, because proximity of parallel tube segments 10 is not dependent on bend radius limitations, but only on the diameter of the tube segments 10, a greater total lamp length can be used inside the fluorescent cavity. The typical fabrication process with this configuration allows spacing between the legs of the lamp 14 down to about 2 mm. The result is the ability to supply more UV with better uniformity throughout the entire inside of the fluorescent cavity (even the corners).

For example, in a 6×8 inch fluorescent cavity, using 15 mm diameter tubing and 2 mm spacing between the tube segments, eight 8-inch segments can be accommodated, for an overall lamp length of about 64 inches. This is a 60% improvement over the prior art.

Figure 3B:
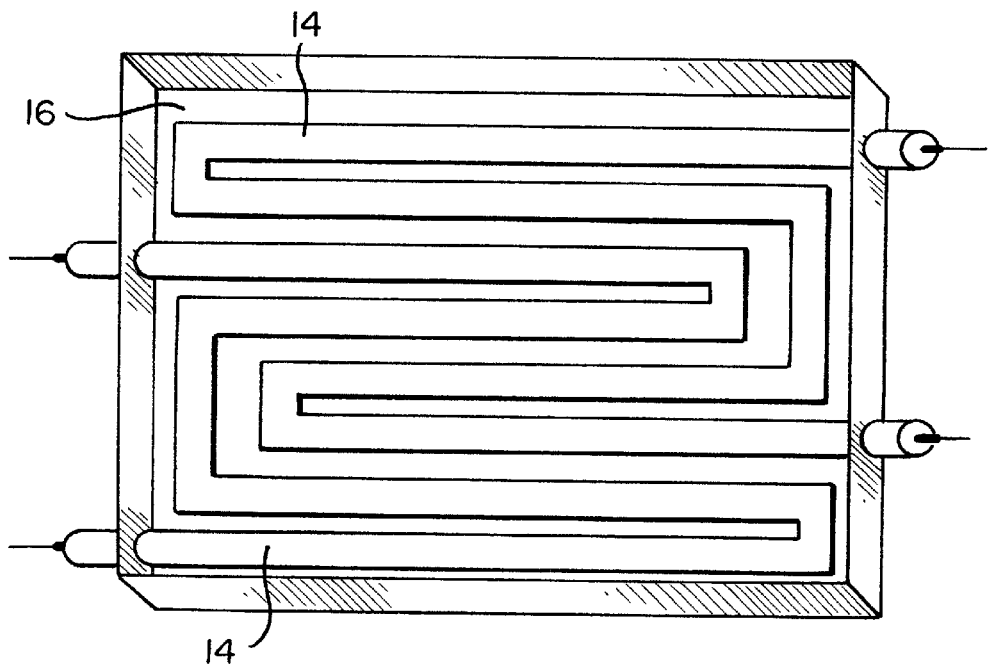
FIG. 3B is a front perspective view of the fluorescent cavity and phosphor illuminator of an alternative embodiment of the present invention, showing multiple lamps.

For a single tube of such length, dimming may become difficult. However, the compact configuration of the phosphor illuminator lamp 14 allows two lamps to be placed within the fluorescent cavity, either interdigitated (as shown in FIG. 3B) or side-by-side (not shown), or otherwise entwined or juxtaposed.

If elliptical or oval tubing is used (made, for example, by partially flattening round tube), and the major axis oriented perpendicular to the back of the fluorescent cavity, an extra segment may be accommodated. For example, if 15 mm diameter round tubing is slightly flattened so that the minor axis is 13 mm, then under the above conditions, nine 8-inch segments can be accommodated within the fluorescent cavity.

Although the preferred construction for the phosphor illuminator lamp 14 uses mitered corners, other joining methods may be used if desired. For example, it is known in the art of compact fluorescent bulbs to couple parallel tubes near one end via a transverse connecting tube. Alternatively, a single straight tube can be bent into a conventional serpentine shape, since no internal phosphors exist within the phosphor illuminator lamp 14 that might be affected by the heating and bending operations. (However, restriction of the arc stream at the corners may result in some UV light loss in the region of each bend.)

Fill Gas

The fill gas type and pressure for the phosphor illuminator lamp 14 are critical to starting and run-time efficiency at a selected ambient temperature. In the preferred embodiment of this invention, the fill gas is a mixture of about 90% to about 95% argon, with the remainder being neon. The most preferred mixture is about 95% argon and 5% neon. This slightly neon "poisoned" mix allows for a significantly lower ignition voltage. This is particularly true at low temperature (e.g., about −55° C.) operation. Lower ignition voltages reduces the complexity of the lamp drive circuitry and allows for high control at low drive conditions. For a given ambient temperature, a change in fill gas pressure of a gas discharge lamp will change the UV and visible light output of the lamp. This characteristic can be used for controlling the light output at preselected ambient conditions. Typical fill gas pressures for the preferred embodiment of the invention are about 0.5 to about 3 torr. For example, a fill pressure at the lower end of this range (about 0.75 torr) allows most efficient operation at approximately 70° C. at the envelope surface. A higher fill gas pressure (about 3 torr, for example) would allow most efficient lamp operation at approximately 50° C. at the envelope surface. In general, the fill pressure can be modified to match the surrounding environment where the backlight would most often be used.

Conversely, for a particular fill gas pressure, the UV and visible light output values of the lamp can be affected by changes in the surrounding temperature. It has been found that the temperature of the electrodes substantially determines the UV and visible light output of the phosphor illuminator lamp 14. This temperature can be controlled to maintain desired output values over a range of ambient temperatures. For example, a fan can be provided to cool the electrodes of the phosphor illuminator lamp 14 when they are too hot, and active cathode filament heating can be used to provide heat when they are too cool, thereby maintaining optimal light output despite some variations in ambient temperature.

Before sealing the phosphor illuminator lamp 14 from atmospheric air, the lamp envelope is fully evacuated and then filled with the selected argon/neon gas mixture at the desired fill pressure. About 4 to 6 microliters of mercury is introduced into the envelope in liquid form or in a capsule or pellet, in known fashion.

In use, the phosphor illuminator lamp 14 is coupled to a control/driver 22, described hereinbelow.

(2) FLUORESCENT CAVITY

Basic Construction

In the present invention, the phosphor illuminator lamp 14 described above is positioned within a fluorescent cavity. The interior of the fluorescent cavity is substantially coated with phosphor, which generates visible light when illuminated with UV from the phosphor illuminator lamp 14.

Figure 4:
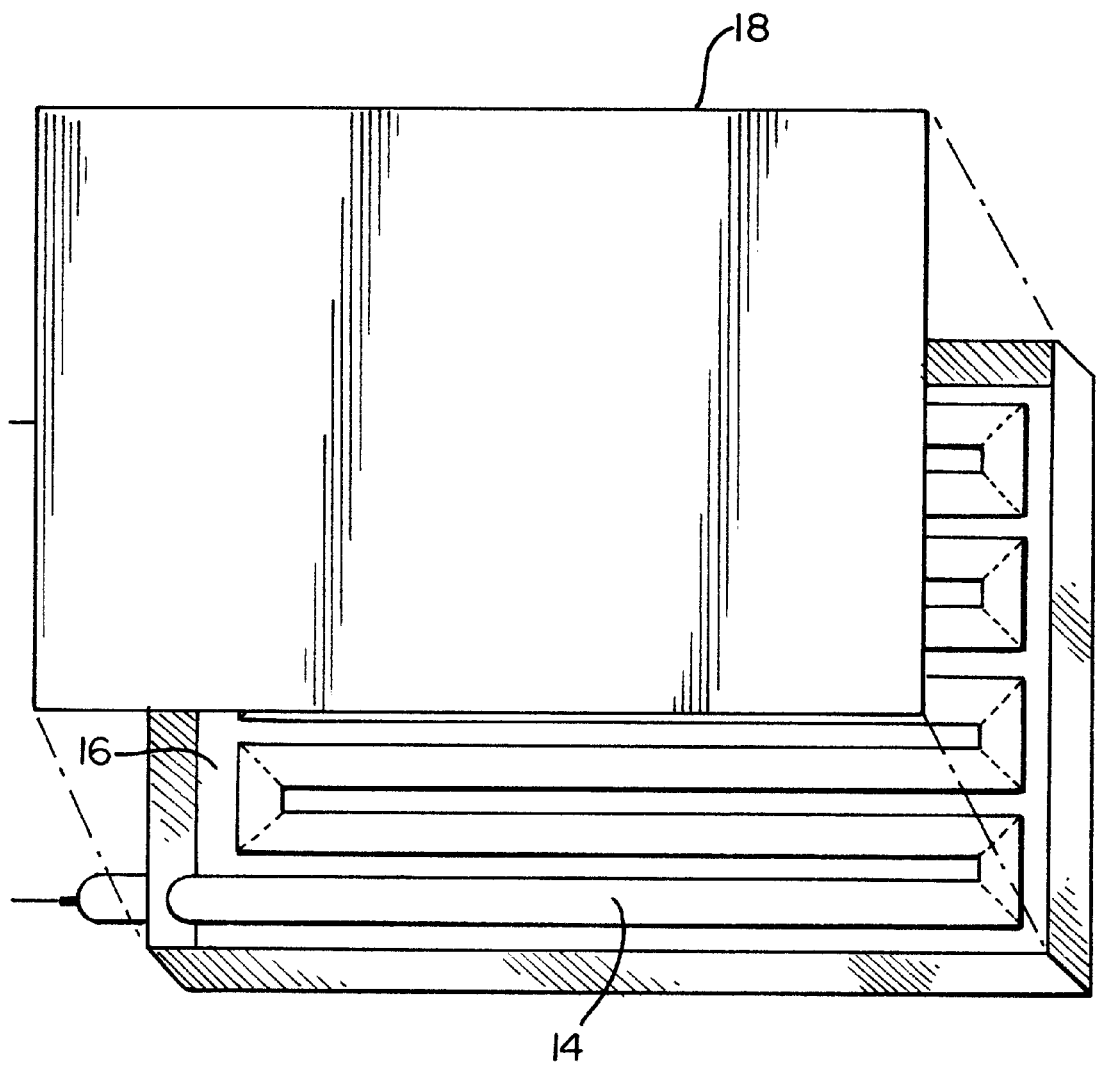
FIG. 4 is a front perspective partially exploded view of the fluorescent cavity and phosphor illuminator and cover of the preferred embodiment of the present invention.

The fluorescent cavity of the preferred embodiment of the present invention is constructed in a generally concave shape out of opaque structural material, such as metal or plastic. Referring to FIG. 4, the cavity 16 is generally shaped in the form of a shallow open box having a depth usually 1.5 to 2 times the outside diameter of the phosphor illuminator lamp 14.

The open top or front of the cavity 16 is preferably about 1 or 2 mm larger in each dimension than the transmissive display area to be illuminated, so as to provide even illumination of the edges of the display even when viewed at a substantial angle. The length and width of the cavity 16 may have any desired values, but preferably sized so that the sidewalls of the cavity 16 are within about 1 to 10 millimeters of the phosphor illuminator lamp 14 so as to more efficiently accept incident UV and generate visible light. A typical fluorescent cavity 16 would be approximately 6×8 inches by 1 inch deep, using a 12 mm diameter tube for the phosphor illuminator lamp 14.

The fluorescent cavity 16 may be made using standard manufacturing methods for forming mechanical structures (e.g., molding, stamping, pressing, casting, machining, or piece part fabrication), depending upon the material type selected. The cavity 16 may be formed in any planeform shape which generally conforms to the shape of the viewing area of the transmissive display to be illuminated. The juncture 20 of the backplane and sidewalls of the cavity 16 preferably forms a right angle, but may be chamfered or rounded. In the preferred embodiment of the present invention, the cavity 16 is preferably made of formed opaque sheet material.

Although the fluorescent cavity 16 has been described in terms of a box, other configurations may be used. Preferred are configurations that increase the interior surface area of the cavity 16, such as by dimpling, corrugating, or patterning the internal surfaces. As another example, the back of the cavity 16 may be larger than the display, and the sidewalls of the cavity 16 slanted inward to the display, thus increasing the internal surface area of the cavity by the increase area of the back and the increase in the length of the sidewalls.

As another example, although the preferred embodiment of the present invention is box shaped, other shapes for the phosphor illuminator lamp 14 and fluorescent cavity 16 may be used for specialized applications. For example, a round or spiral shaped phosphor illuminator lamp 14 may be used in a round, hexagonal, square, etc., fluorescent cavity 16 where only a portion of the transmissive display need be backlit, as in a circular instrument face.

As yet another example, the fluorescent cavity 16 may be configured in any way such that the surface facing the display transmits light, and the other surfaces are substantially opaque. Thus, an assembly that has (1) a transmissive front surface and opaque sidewalls, and (2) a removable or transfigurable opaque back, is within the scope of the present invention.

Cavity Coatings

The inside of the cavity 16 is typically made of, or painted or coated with, a matte white base material that generally reflects (i.e., does not provide selective absorption of) and diffuses the visible light generated by the phosphor coating. The base material is preferably also highly reflective with respect to the UV light generated by the phosphor illuminator lamp 14, and does not change color or degrade under UV exposure or at temperatures below about 270° C. In the preferred embodiment of the present invention, the base coating is a matte white paint, available from a number of sources.

The recommended matte white coating should also be undercoated with a material that is neutral in its reflectance characteristics to minimize the effects of nonuniform layers of paint and which provides better adhesion of the base coating to the cavity 16. In the preferred embodiment of the present invention, the undercoating is Poulane™ undercoater paint, available from Sherman-Williams.

After the base coating is applied and cured, a photoluminescent phosphor or blend of phosphors which emit visible light when excited by UV photons is applied to the interior of the cavity 16, preferably applied by a spray deposition process. The phosphor(s) is selected to produce a visible light output which conforms to the desired color characteristics of the display device. In the preferred embodiment of the present invention, the phosphor is selected to provide blue light at about 447 nm, green light at about 545 nm, and red light at about 611 nm. Phosphors with such qualities are available from a number of sources.

Phosphors with these wavelengths produce a spectral color that is white, near the upper boundary of the D6500 isotemperature line on the CIE chromaticity scale (u'=0.183, v'=0.483). This produces a light which is perceived as very white to the human eye. The spectral content of the light is well matched to the color filters of most displays. Other backlight systems produce white light as well, but have a tendency to be nearer the Planckian locus of the CIE chromaticity scale, resulting in a lower luminous efficiency.

A number of compounds can be used as an adhesive to adhere the phosphor to the inside of the cavity. Preferred are silicate solutions which suspend phosphor particles in silicon dioxide (i.e., quartz) and provide a protective encapsulant without compromising the exposure of the phosphors to incident UV. The preferred adhesive is a very high purity ethyl silicate that is about 90% hydrolyzed, available from Unicast Corporation of Yonkers, N.Y.

Cover

The open face of the cavity 16 is sealed, after installation of the phosphor illuminator lamp 14, by a phosphor-coated cover 18 (see FIG. 4). The cover 18 is typically a visible light transmissive material which is selected to produce no change in the desired spectral emissions of the visible light formed in the cavity 16. The cover 18 may be glued onto the fluorescent cavity 16, or removably attached with mechanical fasteners.

More particularly, the cover 18 can be a "water white" glass or any of a number of similar UV resistant glasses, ceramics, or plastics. The cover 18 can be clear, or may be tinted to tailor the color of the backlight to a desired chroma, relieving the full burden of color determination from the thin color filters resident on the active glass of the transmissive display. The cover 18 is coated on the side facing the interior of the cavity 16 with the same phosphor mixture used to coat the interior of the cavity 16, which may be deposited in the same manner. Preferably, the coating should be about 5 phosphor particles thick. In the preferred embodiment, the cover 18 is smooth on the phosphor side and lightly ground or etched on the other side. The lightly ground or etched side provides added diffusion for the backlight system with little or no absorptive losses.

It has been demonstrated that the phosphor coating (i.e., phosphor and binder) of the fluorescent cavity 16 and cover 18 is greater than 97% transmissive to visible light when in the active or luminescent state. This means that light generated on the opaque sides and rear of the cavity 16 passes through the cover 18 virtually unobstructed. Thus, the cover 18 of the present invention is an "active" element, in that it converts incident UV light to visible light while acting as a non-absorptive "passive" diffusing element for visible light generated within the fluorescent cavity 16.

Such a cover 18 should be contrasted with prior art diffusers. A "diffuser" is often used to compensate for the non-uniformities of light distribution and dark areas in prior art backlight cavities created by bending the fluorescent lamp. The design intent of a diffuser is to provide a luminous distribution profile on the face of the diffuser that mimics a Lambertian emitter (one that gives the appearance of having the same luminance regardless of the viewing angle). A prior art diffuser is typically a milky-white plastic or similar material that does a fair job of scattering the light but at a high loss of luminance. Losses incurred through absorption with diffusers of this type are generally on the order of 50%.

Thus, a significant benefit realized from the inventive configuration is the elimination of the absorptive diffuser used with conventional serpentine fluorescent lamp backlights.

Also in prior art reflective cavities, internal diffusion with the cavity is accomplished by means of surface texturing (i.e., smooth and mirror-like surfaces are not typically used).

As in the prior art, the inventive cavity 16 is designed to diffuse light before the light exits the cavity. Better diffusion inside the backlight cavity 16 results in less of a burden on the diff using element that is used as the backlight cover. This means that more transmissive diffusing elements can be used and efficiency is increased. Because substantially the entire cavity is coated with phosphors in the present invention, and each individual phosphor particle emits light in a dispersive, omniradiant profile, the fluorescent cavity 16 is in effect self-diffusing. Thereafter, further diffusion of generated light is by means of the matte white base coating and the etched or ground cover 18.

As a result of the high level of light dispersion and diffusion in the present invention, uniformity of illumination across the front of the cover 18 is greater than about 90%. The uniformity of illumination across the a typical prior art backlight is only about 40%.

Directional Intensifier

Light produced in the inventive backlight is not needed at all possible viewing angles. Generally, a limited viewing range is adequate for most applications. Accordingly, system efficiency can be improved by focusing light generated by the backlight in a limited pattern. That is, directional gain is achieved by modifying the light distribution pattern of the backlight after it has been diffused.

Omniradiant light generated in the backlighting assembly of the present invention can be collected and redirected into a cone commensurate with the viewing angle requirements for a display. A focusing element or directional intensifier can be overlaid onto the face of the cover 18 to redirect the scattered or diffused light to desired viewing angles, resulting in an increase of luminance on the face of the display. One way to do this is by using micro-replicated optics. These optical elements are on the order of 0.020 inches thick. In practice, such optical elements may be an array of achromatic refracting prisms or similar structures used to channel light emitted at angles that exceed the required viewing angle, and light emitted at extreme angles that would normally be lost to absorption inside the display housing, into a concentrated cone. Achromatic refracting prisms are easily manufactured and work on the principle of refracting (bending) light into a cone determined by the prism angle. Such prisms operate on a principle similar to the optical elements used for focusing traffic signals. A film incorporating such prisms is available from 3M Corporation under the name "Brightness Enhancement Film".

Gain figures associated with directional intensifiers are largely dependent on viewing angle. A typical display with modest off-axis viewing requirements may be required to provide a viewing cone of +30°. The directional gain for this viewing angle would be approximately 35%.

Characteristics

The preferred materials that comprise the cavity 16 and cover 18 (aluminum or plastic, and glass, respectively) offer excellent containment of ozone, thus permitting use of ozone producing quartz for the envelope of the phosphor illuminator lamp 14. In other instances, ozone free quartz or UV transmitting glass can be used, thus eliminating ozone production (with some loss of efficiency).

In the present invention, light gain is realized as the ratio of emitting surface to active area of the LCD, analogous to prior art serpentine fluorescent backlights. A cavity 16 and cover 18 measuring 6×8 inches by 1 inch has a cover (i.e., display) area of 48 square inches, but a total phosphor-coated surface area of 124 square inches. The gain factor (emitting area to display area) is thus 124/48, or 2.6. For a prior art backlight of similar dimensions, the gain factor typically would be about 0.5 at the same power level.

(3) CONTROL/DRIVER

Lamp Electrodes

The growing need for flat panel transmissive displays has precipitated a second generation of recurring problems that were once unique to CRT displays. The four most significant problems for flat panel displays are off-axis daylight readability, dimming, mean time between failure (MTBF), and NVIS compatibility. All these problems are related to the functionality of the backlight system. Prior art fluorescent lamps are driven very hard to produce sufficient luminance for daylight readability. The result of heightened drive in a lamp is short lamp life. This occurs for two reasons:

(1) Heightened drive requires an abundance of electrons. In a hot cathode gas discharge lamp, the cathode must be heated by passing an electric current through a coiled tungsten filament. Work reduction materials, or secondary emitters (e.g., triple carbonates), are added to the cathode and are used to extend filament life and increase the overall luminous capacity of the lamp. Heat is required to liberate electrons from the work reduction materials added to the cathode filament. Once freed from the secondary emitter materials, these electrons are the major current carriers in the lamp. A consequence of this heating action is that the materials that are added to the cathode are boiled off. This is visually evidenced by a blackened ring (former cathode material) that condenses on the inside of the lamp envelope near the cathode. When too much material is removed from a cathode, the cathode electrode opens and the lamp fails. Operating the filaments at higher power (higher heat) accelerates this process. Thus, hot filament lamps operated at elevated drive conditions are not ideally suited to sustaining the high current (electron) densities required for high luminance.

(2) Hot cathode lamps are more easily dimmed than cold cathode lamps, thus they are more often used for backlights. The lamp luminance is the average of the peak momentary luminance and the decay luminance of the phosphor. Dimming a fluorescent lamp literally requires repeatedly starting the lamp at a low but controlled repetition rate. High ignition voltages and increased ignition repetition are the primary source of cathode etching. This ignition mechanism takes a tremendous toll on the cathode, and cathode material is lost much in the same fashion as operating the lamp at high luminance values.

Preheating a cathode before igniting the lamp is one way to extend the projected life of the cathode. Accordingly, the control/driver of the present invention includes this capability, and a coiled coil cathode at each end of the lamp envelope is preheated before the lamp is put to use. In addition, multiple cathode filament drive levels are used depending on the current demand and luminous output of the backlight assembly. In some instances, typically high drive conditions, the cathode filament drive is removed completely. This is possible because the self-heating that occurs in the cathodes due to "cathode fall" meets the conditions for electron liberation from the secondary emission materials. "Cathode fall" refers to the energy, consumed in the vicinity of the cathodes, necessary to convert electron energy (input) to kinetic energy used in the arc stream to sustain the gas discharge (output).

The primary reason for the projected extended life of the cathode assembly of the present invention is the reduced drive conditions of the phosphor illuminator lamp 14 made possible because of the increased luminous efficiency of the backlight system and because each lamp is operated at a significantly reduced ignition voltage.

Ignition Characteristics

A gas discharge lamp ignites via avalanche electron current flow when there is sufficient ion mobility (causing electron mobility in the opposite direction). This condition is met when there is a sufficient number of free electrons liberated from the cathode and a sufficiently high potential (voltage) applied to the anode of the lamp.

In all instances, a sufficient amount of average energy must be delivered to the lamp to achieve current flow through the lamp. For example, if the lamp is operated at a 60 Hz drive frequency, the pulse width is 100 microseconds, the applied current is limited to 1 milliamp, and the applied voltage is limited to 500 volts, then a controlled amount of energy is delivered to the lamp. If the frequency of operation is doubled to 120 Hz and the voltage and current are held to the same values, the amount of energy delivered to the lamp is doubled. In the preferred embodiment of the control/driver electronics, energy is delivered to the lamp in the form of voltage and current in time. Both voltage and current are highly regulated under all operating states of the lamp via the duty cycle control of the control/driver 22.

The energy consumed by the lamp provides a fixed but controlled amount of UV energy to be absorbed by the phosphors on the inside of the fluorescent cavity 16 to make visible light. The higher the energy consumption in the lamp, the more UV that is produced, and the more visible light that is produced in the backlight. Under low drive conditions where a very narrow square wave drive pulse is applied to the lamp, the current allowed to flow through the lamp is limited. To meet the minimum drive conditions required by the lamp, the applied voltage must be increased to keep the energy at a desired state.

Using this principle, the control/driver 22 used in the inventive backlight system employs a unique digitally controlled circuit to control the lamp cathode voltage and arc current and voltage. The control/driver 22 allows the phosphor illuminator lamp 14 to be controlled at both half cycles of operation (thus providing pre- and post- lamp control).

Control/Driver Description

Figure 5:
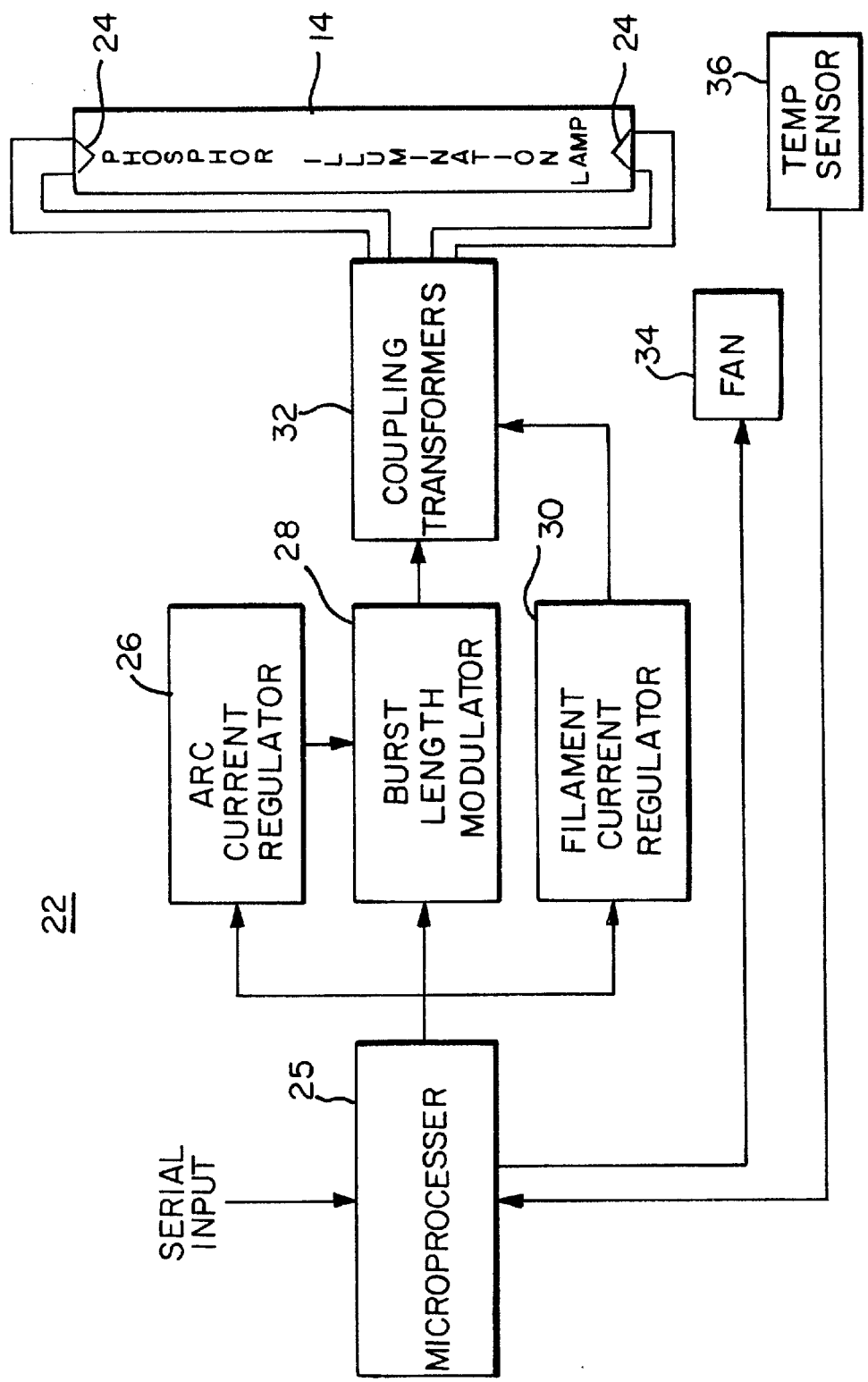
FIG. 5 is a block diagram of the drive/controller electronics of the preferred embodiment of the present invention.

FIG. 5 is a block diagram of the control/driver 22 of the preferred embodiment of the present invention. The control/driver 22 are connected to the cathodes 24 located at each end of the phosphor illuminator lamp 14. The control/driver 22 provides excitation to heat the cathodes and supplies a controlled arc current to the illuminator. The control/driver 22 are designed to provide this excitation at a very high efficiency.

The control/driver 22 includes a processor 25 (which may be, for example, a microprocessor or microcontroller), a programmable arc current regulator 26, a programmable burst length modulator 28, a programmable filament current regulator 30, coupling transformers 32, and preferably a fan 34 and temperature sensor 36, coupled as shown in FIG. 5.

The control/driver 22 has both power and control inputs. The power input is preferably a single DC voltage with a relatively wide tolerance, typically ±20%. The nominal DC voltage (e.g., 12 volts, 28 volts, or 270 volts) may be tailored with relatively small circuit modifications.

The control input preferably is a serial digital interface (e.g., RS-232 or RS-422 interface) to the processor 25. Through this interface, a dimming level can be selected by a user or another processor. In the preferred embodiment, the dimming level can be translated by the processor 25 into a lamp excitation signal having 8,000 levels of resolution. The 8,000 levels of excitation provide a dimming ratio of more than 2,000:1 with adequate control resolution at both minimum and maximum brightness extremes.

Using the processor 25, the phosphor illuminator lamp 14 can be controlled to perform over a wide temperature range (−40° C. to +71° C.) while maximizing the lifetime of the phosphor illuminator lamp 14. The processor 25 controls at least the following five functions:

(1) Filament current (OFF/LEVEL1/LEVEL2)
(2) Arc current regulator (OFF/LEVEL1/LEVEL2/LEVEL3 )
(3) Burst length modulator (selection of one of 8,000 states)
(4) Fan (ON/OFF)
(5) Acquisition of lamp temperature data The processor 25 controls filament current by selecting an output current for the filament current regulator 30. Filament current is applied to heat the cathodes 24 before application of arc current excitation, in order to minimize cathode sputtering. In the preferred embodiment, three outputs can be selected for the filament current regulator 30. Filament current is halted (i.e., turned OFF) when the phosphor illuminator lamp 14 temperature and arc excitation level are at values which do not require cathode heating. Filament current LEVEL1 is a "normal" value of filament current, empirically determined, that supplies some heating to the cathode filament to maintain optimum UV light output. Filament current LEVEL2 is greater than LEVEL1, and is used at a cold start to accelerate cathode 24 heating for the phosphor illuminator lamp 14. Other levels of filament current may be programmed if desired.

The processor 25 controls arc current to the phosphor illuminator lamp 14 by selecting both a current and a voltage output for the arc current regulator 26. The arc current regulator 26 uses switch-mode circuit techniques to control an inductor current. This inductor provides a controlled energy source to provide the voltage-time excitation necessary to ionize the gas in the phosphor illuminator lamp 14 prior to establishing an arc. The voltage developed across the phosphor illuminator lamp 14 at the beginning of each "on" interval is inversely related to the duration of the preceding "off" interval, and is much greater than the voltage developed across the lamp once ionization reaches the required level. That is, the longer the time that energy is not supplied to the phosphor illuminator lamp 14, the higher the voltage necessary to re-initiate the arc stream. Typically (depending on lamp length), 1000 volts for 10 microseconds (at no current) provides the ionization necessary to establish an arc of 100 ma at 100 volts.

In the preferred embodiment, four levels of arc excitation can be selected by the processor 25: OFF, and three increasing levels of current (LEVEL1, LEVEL2, and LEVEL3).

The selected current level and voltage is coupled to the phosphor illuminator lamp 14 through the burst length modulator 28 under control of the processor 25. The burst length modulator 28 chops the current from the arc current regulator 26 to the phosphor illuminator lamp 14 for a percentage (duty cycle) of the modulation interval (4 mS, in the preferred embodiment). During the "on" time interval, the polarity of the excitation to the phosphor illuminator lamp 14 is reversed rapidly (in the preferred embodiment, at 8 microsecond intervals). In the preferred embodiment, the excitation can be terminated at ½ microsecond intervals during the "on" time, thus providing 8,000 discrete excitation values. A low impedance is connected between the two cathodes 24 at the termination of the lamp "ON" time, providing precise quenching of the lamp output.

Figure 6:
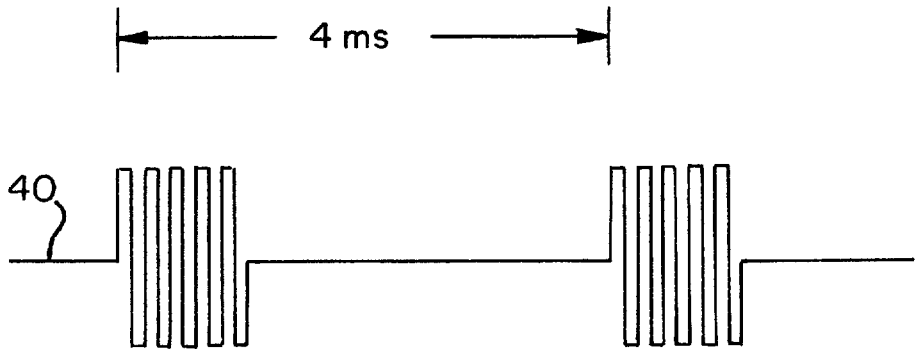
FIG. 6 is a timing diagram for the drive/controller electronics of the preferred embodiment of the present invention.

This duty cycle is illustrated in FIG. 6. Waveform 40 shows a number of 8 $\mu$S chopping cycles within a 4 mS modulation interval. The ratio of the total time of the chopping cycles to the modulation interval is the dimming ratio. For example, if the processor 25 is commanded to generate at 1% of full illumination, the processor 25 programs the burst length modulator 28 to output five 8 $\mu$S chopping cycles. That is, 1% of 8,000 possible excitation levels equals a value of 80. Each excitation level is equivalent to ½ $\mu$S of excitation, thus level 80 equals 40 $\mu$S of excitation, or five 8 $\mu$S chopping cycles (on a linear scale; non-linear scales may be used).

As noted above, sustaining or creating the arc stream depends on the prior state of the lamp 14. In the preferred embodiment, a look-up table is used to determine the requisite arc current, arc voltage, and filament current necessary for a selected dimming level and lamp temperature (such temperature affects the state of the arc stream). For any particular phosphor illuminator lamp 14, the values of the table can be determined empirically.

The coupling transformers 32 provide isolation of the phosphor illuminator lamp 14 from the arc current regulator 26 and the filament current regulator 30. Transformer isolation permits implementation of the control/driver 22 with a wide range of relatively low input voltages. That is, the ratings of the circuit elements do not need to be at the 1000 volt level present at the phosphor illuminator lamp 14 during ignition.

The processor 25 operates the fan 34 to cool the phosphor illuminator lamp 14 when indicated by the temperature data acquired from the temperature sensor 36. The processor 25 also commands levels of arc current to provide the combination of current level and duty cycle to provide the commanded light output at lower temperatures. These higher levels of excitation also serve to heat the cathodes 24 of the phosphor illuminator lamp 14 at cold operating temperatures.

Dynamic Cathode Heating

Figure 7:
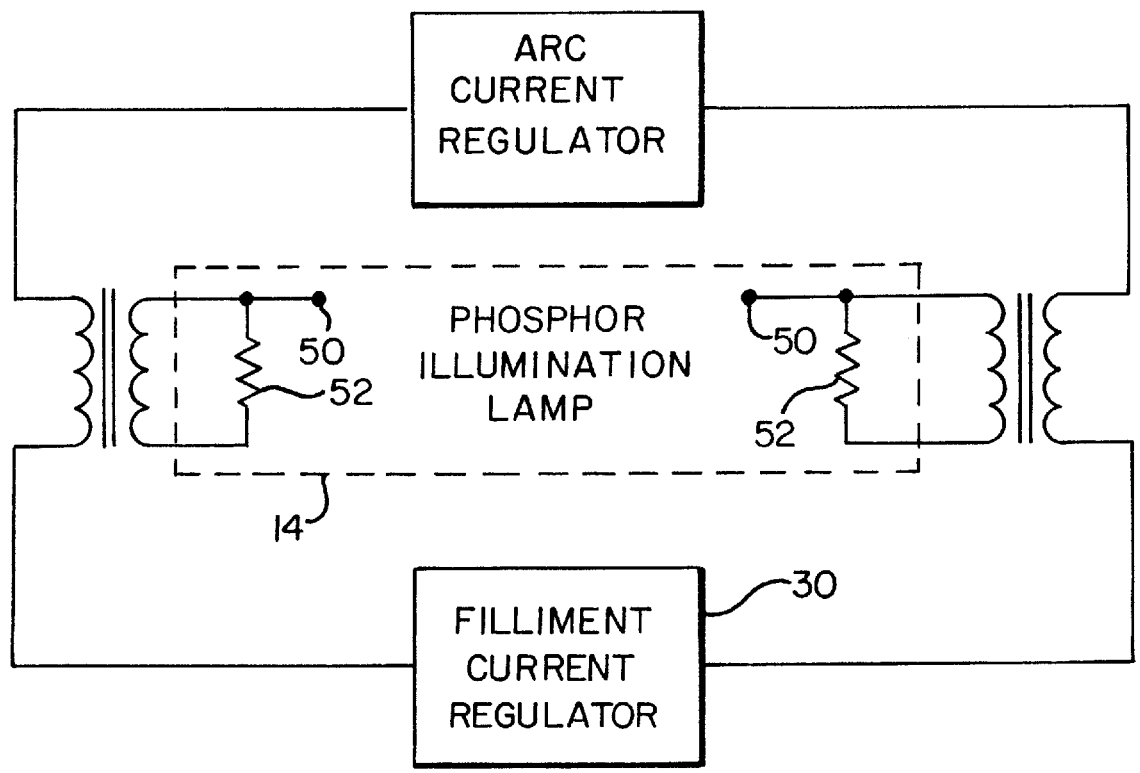
FIG. 7 is a schematic diagram of part of the drive/controller electronics shown in FIG. 5.

An important realization stemming from the present invention that has broad applicability to gas discharge tubes relates to dynamic control of the hot cathodes 24. It has been discovered that the efficiency and projected cathode life of the phosphor illuminator lamp 14 can be substantially increased by heating the cathodes 24 only when necessary to sustain or create the arc stream. This aspect of the invention can be better understood by reference to FIG. 7.

Because of the dual-ended operation of the phosphor illuminator lamp 14, each end of the lamp 14 has an anode 50 and a filament cathode 52. Arc current is supplied by the arc current regulator 26, while filament current is supplied by the filament current regulator 30. As noted above, the principal purpose of the cathode 52 is to provide sufficient electrons to generate the arc stream. In a conventional, non-dimmable fluorescent lamp, the arc current is sufficient to sustain the arc after creation. Hence, the filament cathode can be taken out of the circuit or operated with minimal current. However, in dimmable fluorescent lamps, the filament is kept hot during low drive conditions, since extra electrons are needed at low light levels to sustain/generate the arc stream.

In the present invention, it was realized that the purpose of the filament cathode current was to heat the cathodes 52 to create electrons. However, a substantial amount of self-heating exists in the lamp due to cathode fall. Further, particularly for cathode filaments mounted axially within the lamp envelope, heat is reflected from the envelope into the cathodes 52. Accordingly, the present invention takes advantage of cathode self-heating by providing cathode current only when required to maintain the arc stream. In particular, the temperature sensor 36 is preferably mounted near a cathode 52 of the phosphor illuminator lamp 14. Monitoring the temperature of the envelope surface in the vicinity of the cathodes 52 provides an indication of cathode temperature. Using this temperature information, a number of discrete levels of cathode current can be empirically determined for particular lamp characteristics (e.g., tube diameter and length, fill gas mixture, etc.) and dimming levels (e.g., more cathode heating required at lower light levels). Such levels can be stored in a look-up table for selection by the processor 25 during operation of the phosphor illuminator lamp 14. Such dynamic control of the cathode current can be applied in any dimmable gas discharge tube (including fluorescent lamps) where higher efficiency is desirable.

BENEFITS OF THE INVENTION

Efficiency—The preferred embodiment of the present invention has more than 5 times the efficiency of conventional prior art backlight systems.

Heat—Because of the efficiency of the present invention, less power is required to generate a desired luminance level compared to the prior art. Hence, less heat is generated.

Dimming Range—Most backlighting systems cannot achieve the 2,000:1 dimming ratio required for general use of transmissive displays in adverse lighting conditions. A 4×4 inch backlight built in accordance with this present invention has demonstrated a dimming ratio in excess of about 48,000:1.

Useful Life—The inventive backlight system should provide a phosphor life which is far in excess of ordinary backlights because the phosphor is not exposed to mercury vapor and metal ions from the cathode. Conventional fluorescent lighting technologies exposes the phosphor to these contaminants, resulting in a reaction and subsequent contamination of the phosphor, which reduces light output.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. In combination for providing backlighting of a display member to enhance viewing of an image on the display member:

(a) a plurality of tubes filled with at least one inert gas having properties of becoming energized and with an additive having properties of becoming ionized when the inert gas becomes energized and of generating ultraviolet energy upon becoming ionized, each of the said tubes possessing at least one anode and one cathode, wherein said tubes are made from material allowing substantially all UV radiation to pass through without absorption, and wherein said tubes lack any inner coating of photoluminescent material;

(b) an enclosure for the tubes comprising a front, back, sides, top and bottom, wherein the inner surfaces of said structure are comprised of a material reflective of visible light and wherein the front surface of said enclosure is comprised of a material transparent to visible light, and wherein all six said surfaces are coated with a light emissive material that is responsive to the ultraviolet energy from the tubes by converting the ultraviolet energy to visible light, said light emissive material being essentially transparent to visible light, thereby producing visible light for passage through the coated front surface to provide backlighting for the display member; and (c) a circuit operatively coupled to a tube for simultaneously producing and controlling a plurality of independent electrical currents within said tube, including a cathode current passing through a filament type cathode and a separate arc current drawn by a voltage potential between a cathode and an anode, the arc current thereby traversing a path from a cathode to an anode within said tube, and wherein the plurality of electrical currents operate in concert to regulate and control the power discharged through the tube in the production of ultraviolet light, thereby providing a plurality of selectable levels of visible light produced within the enclosure in response to excitement of said inert gasses and ionization of said additive.

2. The combination of claim 1 wherein the circuit operatively coupled to the tube further comprises:

an analog temperature sensor mounted proximate to said cathode for monitoring the temperature of said cathode;

an analog/digital converter for converting temperature data to digital format;

a microprocessor; and means for channeling said digital temperature to the microprocessor.

3. The combination in claim 2 wherein the voltage potential between the anode and cathode is controlled by said microprocessor using an algorithm that takes into account data from a group consisting of the arc current, cathode currents, cathode temperatures or any combination of these elements.

4. The combination of claim 2 wherein said circuit transmits the arc current at a variable frequency as determined by said microprocessor.

5. The combination in claim 4 wherein the variable frequency arc comprises a sinusoidal waveform.

6. The combination in claim 4 wherein the variable frequency arc comprises a square wave.

7. The combination in claim 2 wherein the voltage potential between the anode and cathode is controlled by said microprocessor and wherein said voltage is regulated in a continuous sequence of pulses or duty cycles of approximately four-millisecond duration each duty cycle being comprised of an "on" period of voltage and an "off" period of no voltage, and wherein the length of time said voltage is in the "on" state can be increased incrementally in increments of approximately ½ microsecond duration, ranging from zero microseconds to the entire 4 millisecond period of said duty cycle, thereby providing approximately 8,000 incremental levels of luminescence.

8. The combination in claim 7 wherein the voltage potential between the anode and cathode is selectable in at least two levels in addition to an off state.

9. The combination in claim 2 wherein the cathode temperature can be raised or lowered by running a controlled current through the filament-type cathode, said current being adjustable to at least two different current levels in addition to an off state, and wherein said current is controlled by said microprocessor.

10. The combination in claim 2 wherein said microprocessor controls an on/off state of a fan which is positioned to provide cooling for said cathode.

11. The combination of claim 1 wherein the front surface of said enclosure is selected from a group comprising 'white water' glass, ceramics or plastics which are resistant to UV radiation while being transparent to visible light, and wherein said light emissive material covering the inner surfaces of said enclosure is a phosphor that efficiently converts the ultraviolet energy to visible light.

12. The combination of claim 1, wherein the additive in each of the tubes is mercury and there is more than one inert gas in each of the tubes the inert gases including argon and neon.

13. The combination in claim 12, wherein the inert gases are approximately 95% argon and approximately 5% neon.

14. The combination in claim 1 wherein the enclosure is substantially sealed to prohibit escape of ozone from said enclosure.

15. The combination of claim 1 wherein the tubes within the enclosure are configured in a serpentine or other non-linear shape, and wherein the non linear configuration is achieved by mitering.

16. The combination of claim 1 wherein said plurality of tubes are fit into a single backlighting enclosure through interdigiting or interlacing of the tubes.

17. The combination of claim 1 wherein the inside diameter of said tubes are on the order of 7 mm to 13 mm.

* * * * *